United States Patent
Malon

(10) Patent No.: US 12,205,027 B2
(45) Date of Patent: Jan. 21, 2025

(54) MULTI-HOP EVIDENCE PURSUIT

(71) Applicant: NEC Laboratories America, Inc., Princeton, NJ (US)

(72) Inventor: Christopher Malon, Fort Lee, NJ (US)

(73) Assignee: NEC Corporation, Tokyo (JP)

( * ) Notice: Subject to any disclaimer, the term of this patent is extended or adjusted under 35 U.S.C. 154(b) by 423 days.

(21) Appl. No.: 17/840,987

(22) Filed: Jun. 15, 2022

(65) Prior Publication Data

US 2023/0035641 A1 Feb. 2, 2023

Related U.S. Application Data

(60) Provisional application No. 63/227,401, filed on Jul. 30, 2021.

(51) Int. Cl.
| | |
|---|---|
| G06F 17/00 | (2019.01) |
| G06F 40/166 | (2020.01) |
| G06F 40/258 | (2020.01) |
| G06F 40/40 | (2020.01) |
| G06N 3/08 | (2023.01) |

(52) U.S. Cl.
CPC ............ *G06N 3/08* (2013.01); *G06F 40/166* (2020.01); *G06F 40/258* (2020.01); *G06F 40/40* (2020.01)

(58) Field of Classification Search
CPC ............ G06F 16/3344; G06F 16/3331; G06F 16/332; G06F 16/31; G06F 16/00; G06F 16/38; G06F 40/10; G06F 40/40; G06F 40/166; G06F 40/20; G06F 40/258; G06F 40/279; G06N 3/0455; G06N 3/088; G06N 3/0475; G06N 3/0464; G06N 3/08; G06N 3/091; G06N 3/09; G06N 3/042
See application file for complete search history.

(56) References Cited

U.S. PATENT DOCUMENTS

| | | | |
|---|---|---|---|
| 2016/0350410 A1* | 12/2016 | Aharoni | G06F 16/3344 |
| 2020/0050621 A1* | 2/2020 | Malon | G06F 16/93 |
| 2021/0192377 A1* | 6/2021 | Malon | G06N 5/045 |
| 2021/0406741 A1* | 12/2021 | Poon | G06N 20/00 |

(Continued)

OTHER PUBLICATIONS

Xu, Weiwen, et al. "Exploiting reasoning chains for multi-hop science question answering." arXiv preprint arXiv:2109.02905 (2021). (Year: 2021).*

(Continued)

*Primary Examiner* — Michael Ortiz-Sanchez
(74) *Attorney, Agent, or Firm* — Joseph Kolodka

(57) ABSTRACT

A method for neural network training is provided. The method inputs a training set of textual claims, lists of evidence including gold evidence chains, and claim labels labelling the evidence with respect to the textual claims. The claim labels include refutes, supports, and not enough information (NEI). The method computes an initial set of document retrievals for each of the textual claims. The method also includes computing an initial set of page element retrievals including sentence retrievals from the initial set of document retrievals for each of the textual claims. The method creates, from the training set of textual claims, a Leave Out Training Set which includes input texts and target texts relating to the labels. The method trains a sequence-to-sequence neural network to generate new target texts from new input texts using the Leave Out Training Set.

20 Claims, 12 Drawing Sheets

(56) References Cited

U.S. PATENT DOCUMENTS

| | | | |
|---|---|---|---|
| 2022/0067278 A1* | 3/2022 | Huang | G06F 40/258 |
| 2022/0237382 A1* | 7/2022 | Abraham | G06F 40/284 |
| 2022/0383159 A1* | 12/2022 | Yavuz | G06N 3/0455 |

OTHER PUBLICATIONS

Yadav, Vikas, Steven Bethard, and Mihai Surdeanu. "Unsupervised alignment-based iterative evidence retrieval for multi-hop question answering." arXiv preprint arXiv:2005.01218 (2020). (Year: 2020).*

Aly et al., "FEVEROUS: Fact Extraction and VERification Over Unstructured and Structured information", arXiv preprint arXiv:2106.05707, Jun. 10, 2021, pp. 1-32.

Cao et al., "Autoregressive entity retrieval", arXiv preprint arXiv:2010.00904, Oct. 2, 2020, pp. 1-20.

Dau et al., "DROP: A Reading Comprehension Benchmark Requiring Discrete Reasoning Over Paragraphs" Proceedings of NAACL-HLT 2019, Mar. 1, 2019, pp. 2368-2378.

Gupta et al., "Neural Module Networks for Reasoning Over Text", arXiv preprint arXiv:1912.04971, Dec. 10, 2019, pp. 1-17.

Karpukhin et al., "Dense Passage Retrieval for Open-Domain Question Answering", Proceedings of the 2020 Conference on Empirical Methods in Natural Language Processing, Apr. 10, 2020, pp. 6769-6781.

Liu et al., "ROBERTa: A Robustly Optimized BERT Pretraining Approach", arXiv preprint arXiv:1907.11692, Jul. 26, 2019, pp. 1-13.

Malon et al., "Team Papelo: Transformer Networks at FEVER", arXiv preprint arXiv:1901.02534, Jan. 8, 2019, pp. 1-5.

Raffel et al., "Exploring the Limits of Transfer Learning with a Unified Text-to-Text Transformer", J. Mach. Learn. Res . . . Jun. 2020, pp. 1-67.

Saha et al., "Weakly Supervised Neuro-Symbolic Module Networks for Numerical Reasoning", arXiv:2101.11802v1 [cs.CL], Jan. 28, 2021, pp. 1-22.

Schlichtkrull et al., "Joint Verification and Reranking for Open Fact Checking Over Tables", arXiv:2012.15115v2 [cs.CL] Aug. 20, 2021, pp. 1-13.

Thorne et al., "Evidence-based Factual Error Correction", arXiv:2012.15788v2 [cs.CL], Jun. 11, 2021, pp. 1-12.

Thorne et al., "FEVER: a large-scale dataset for Fact Extraction and VERification", Proceedings of NAACL-HLT 2018, Mar. 14, 2018, pp. 809-819.

\* cited by examiner

TABLE 1

| Type | Example |
|---|---|
| Sentence | [Mississippi River] When measured from its traditional source at Lake Itasca, the Mississippi has a length of 2,320 miles (3,730 km). |
| List Item | [Temple Tower] LIST CONTEXT Cast VALUE Marceline Day as Patricia Verney |
| Table Cell | [Temple Tower] VALUE Release date {{ KEY Temple Tower VALUE April 13, 1930 }} |
| Table Cell | [L-arabinose operon] CAPTION Catabolism of arabinose in E. coli {{ KEY Substrate VALUE L-arabinose }} KEY Enzyme(s) VALUE AraA KEY Function VALUE Isomerase KEY Reversible VALUE Yes KEY Product VALUE L-ribulose |

FIG. 2

TABLE 2

| System | Recall |
|---|---|
| Baseline sentences | .5265 |
| Ranking sentences | .3875 |
| Baseline cells | .2741 |
| Random cells | .2808 |
| Ranking cells | .5028 |

FIG. 3

TABLE 3

| Hops | Changes | Improved | Same | Worse | Complete evidence | FEVEROUS score |
|---|---|---|---|---|---|---|
| 1 | -- | -- | -- | -- | 2661 | .271 |
| 2 | 1245 | 249 | 7581 | 60 | 2722 | .276 |
| 3 | 572 | 77 | 7768 | 45 | 2737 | .280 |
| 4 | 391 | 44 | 7811 | 35 | 2745 | .280 |
| 5 | 271 | 19 | 7835 | 36 | 2748 | .281 |
| 6 | 202 | 13 | 7846 | 31 | 2744 | .281 |
| 7 | 166 | 11 | 7861 | 18 | 2745 | .281 |

FIG. 5

TABLE 4

| Model | Train/Dev | Label accuracy |
|---|---|---|
| RoBERTa | Gold on Gold | .829 |
| RoBERTa | Gold on Extracted | .550 |
| RoBERTa | Extracted on Extracted | .495 |
| T5 | Gold on Gold | .848 |
| T5 | Gold on Extracted | .572 |
| T5 | Extracted on Extracted | .661 |
| T5 | Extracted+Math on Extracted+Math | .658 |

FIG. 6

TABLE 5

| Truth | Supports | NEI | Refutes |
|---|---|---|---|
| Supports | .340347 | .5179 | .1418 |
| NEI | .0918 | .7146 | .1936 |
| Refutes | .0822 | .4559 | .4619 |
| Supports | .6471 | .0000 | .3529 |
| NEI | .4431 | .0000 | .5569 |
| Refutes | .2341 | .0000 | .7659 |

FIG. 7

MULTI-HOP EVIDENCE PURSUIT

RELATED APPLICATION INFORMATION

This application claims priority to U.S. Provisional Patent Application No. 63/227,401, filed on Jul. 30, 2021, incorporated herein by reference in its entirety.

BACKGROUND

Technical Field

The present invention relates to claim verification systems and more particularly to multi-hop evidence pursuit.

Description of the Related Art

The prior art for claim verification typically attempted to retrieve evidence for a claim using the claim alone. However, some claims may be impossible to verify without referring to previously found evidence.

SUMMARY

According to aspects of the present invention, a computer-implemented method for neural network training is provided. The method includes inputting a training set of textual claims, lists of evidence including gold evidence chains, and claim labels labelling the evidence with respect to the textual claims. The claim labels include refutes, supports, and not enough information (NEI). The method further includes computing an initial set of document retrievals for each of the textual claims. The method also includes computing an initial set of page element retrievals including sentence retrievals from the initial set of document retrievals for each of the textual claims. The method additionally includes creating, from the training set of textual claims, a Leave Out Training Set which includes input texts and target texts, where (a) if any evidence in a gold evidence chain comes from a document not in the initial set, setting a target text to be the claim label plus a first piece of missing evidence, and setting the input text to be a list of retrieved document titles from the initial set plus a corresponding textual claim plus a concatenation of all other evidence in the gold evidence chain, and (b) for a fraction of remaining documents, randomly selected in the initial set, including all labeled NEI, setting the claim label plus a random piece of evidence as the target text, and setting the input text to be the list of retrieved document titles plus the corresponding textual claim plus a concatenation of all other evidence in a corresponding gold evidence chain. The method further includes training, by a processor device, a sequence-to-sequence neural network to generate new target texts from new input texts using the Leave Out Training Set.

According to other aspects of the present invention, a computer program product for neural network training is provided. The computer program product includes a non-transitory computer readable storage medium having program instructions embodied therewith. The program instructions are executable by a computer to cause the computer to perform a method. The method includes inputting, by a user interface of the computer, a training set of textual claims, lists of evidence including gold evidence chains, and claim labels labelling the evidence with respect to the textual claims. The claim labels include refutes, supports, and not enough information (NEI). The method further includes computing, by a processor device of the computer, an initial set of document retrievals for each of the textual claims. The method also includes computing, by the processor device, an initial set of page element retrievals including sentence retrievals from the initial set of document retrievals for each of the textual claims. The method additionally includes creating, by the processor device from the training set of textual claims, a Leave Out Training Set which includes input texts and target texts, where (a) if any evidence in a gold evidence chain comes from a document not in the initial set, setting a target text to be the claim label plus a first piece of missing evidence, and setting the input text to be a list of retrieved document titles from the initial set plus a corresponding textual claim plus a concatenation of all other evidence in the gold evidence chain, and (b) for a fraction of remaining documents, randomly selected in the initial set, including all labeled NEI, setting the claim label plus a random piece of evidence as the target text, and setting the input text to be the list of retrieved document titles plus the corresponding textual claim plus a concatenation of all other evidence in a corresponding gold evidence chain. The method further includes training, by the processor device, a sequence-to-sequence neural network to generate new target texts from new input texts using the Leave Out Training Set.

According to still other aspects of the present invention, a computer processing system for neural network training is provided. The computer processing system includes a memory device for storing program code. The computer processing system further includes a processor device operatively coupled to the memory device for running the program code to input a training set of textual claims, lists of evidence including gold evidence chains, and claim labels labelling the evidence with respect to the textual claims. The claim labels include refutes, supports, and not enough information (NEI). The processor device further runs the program code to compute an initial set of document retrievals for each of the textual claims. The processor device also runs the program code to compute an initial set of page element retrievals including sentence retrievals from the initial set of document retrievals for each of the textual claims.

The processor device additionally runs the program code to create, from the training set of textual claims, a Leave Out Training Set which includes input texts and target texts, where (a) if any evidence in a gold evidence chain comes from a document not in the initial set, set a target text to be the claim label plus a first piece of missing evidence, and set the input text to be a list of retrieved document titles from the initial set plus a corresponding textual claim plus a concatenation of all other evidence in the gold evidence chain, and (b) for a fraction of remaining documents, randomly selected in the initial set, including all labeled NEI, set the claim label plus a random piece of evidence as the target text, and set the input text to be the list of retrieved document titles plus the corresponding textual claim plus a concatenation of all other evidence in a corresponding gold evidence chain. The processor device further runs the program code to train a sequence-to-sequence neural network to generate new target texts from new input texts using the Leave Out Training Set.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a diagram showing TABLE 1 of example representations of various page elements, in accordance with an embodiment of the present invention;

FIG. 3 is a diagram showing TABLE 2 indicating page element recall, in accordance with an embodiment of the present invention;

FIG. 5 is a diagram showing TABLE 3 indicating the performance of the next hop predictor of FIG. 4, in accordance with an embodiment of the present invention;

FIG. 6 is a diagram showing TABLE 4 indicating label classification models, in accordance with the present invention;

FIG. 7 is a diagram showing TABLE 5 indicating a confusion matrix, in accordance with an embodiment of the present invention;

DETAILED DESCRIPTION OF PREFERRED EMBODIMENTS

Embodiments of the present invention are directed to multi-hop evidence pursuit.

A neural network text generation model is trained to generate the title and text of missing evidence, given a preliminary set of evidence, simultaneously to predicting a label indicating whether the text of the missing evidence will support the claim. After retrieving a document if possible or using previously retrieved documents if not, potential actual evidence is scored against generated evidence. The best matching potential actual evidence replaces the lowest ranked evidence in the preliminary set. This generation, retrieval, matching, and replacing process may proceed for many iterations ("hops") until a neural text generation model predicts that no evidence is missing.

Figure 1:
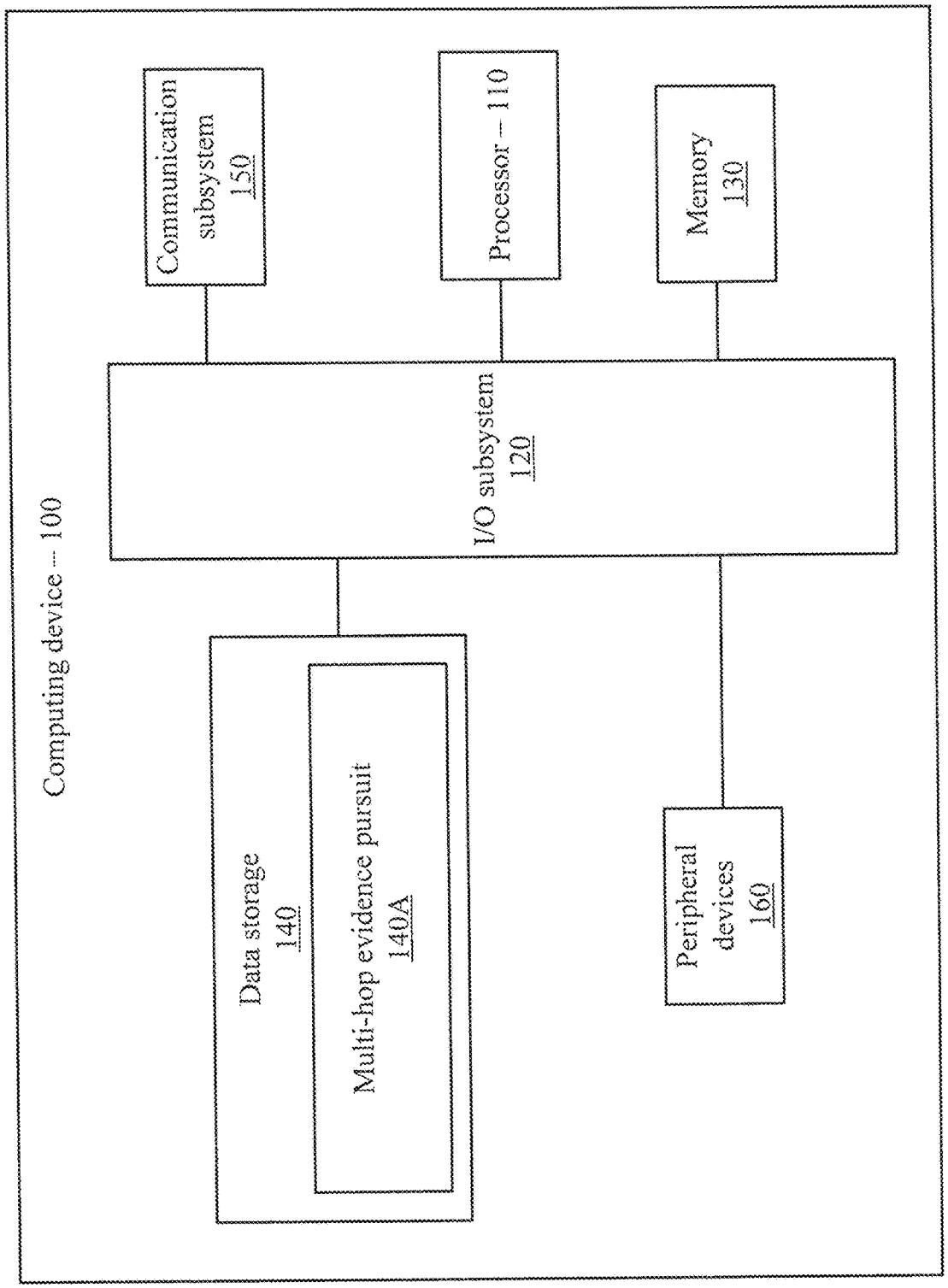
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform multi-hop evidence pursuit.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for multi-hop evidence pursuit. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Generally, our system decides whether input claims (given as a text sentence) are supported, refuted, or unverifiable based on the information in a corpus containing unstructured text, tables, and lists. It also outputs evidence for that decision, quoted from the given corpus.

The FEVEROUS (Fact Extraction and VERification Over Unstructured and Structured Information) task is a particular example of this where a set of claims have been authored by humans and the corpus given is English Wikipedia.

It is evaluated by a score (the FEVEROUS score) counting the fraction of claims that are decided correctly and with all the required evidence output successfully, where evidence output is limited to five sentences/table captions/list items and twenty-five table cells.

In accordance with an illustrative embodiment, a system has been developed for the FEVEROUS fact extraction and verification task that ranks an initial set of potential evidence and then pursues missing evidence in subsequent hops by trying to generate it, with a "next hop prediction module" whose output is matched against page elements in a predicted article. Seeking evidence with the next hop prediction module continues to improve FEVEROUS score for up to seven hops. Label classification is trained on possibly incomplete extracted evidence chains, utilizing hints that facilitate numerical comparison. In an embodiment, the system achieves 0.281 FEVEROUS score and 0.658 label accuracy on the development set.

The FEVEROUS (Fact Extraction and VERification Over Unstructured and Structured Information) task introduces several challenges not seen in the 2018 FEVER task. Tabular information, lists, and captions now appear as evidence, in addition to natural text sentences. Most claims now require multiple pieces of supporting evidence to support or refute them. Even claims that cannot be fully verified now require the submission of supporting evidence for aspects of the claim that can be verified. Counting and numerical reasoning skills are needed to verify many claims.

Annotators for FEVEROUS differed in their interpretation of what constituted necessary evidence, and often added duplicate evidence that should be in an alternative reasoning chain to a main reasoning chain. For this reason it is dangerous to target a precise, minimal set of evidence as in FEVER for high evidence F1, and we instead fill the full set of five sentences and 25 table cells permitted for submission.

Thus the present invention focuses on solving the evidence retrieval problem and first assembles a set of preliminary set of relevant facts. Several of these facts may be combined to determine the veracity of the claim, but from the perspective of retrieval, this is considered a first "hop." Where multi-hop reasoning is required, it may be necessary to retrieve additional documents after reading the preliminary evidence, which could not be searched for using the claim alone. The present invention supports this functionality by predicting whether evidence chains are complete and generating additional search queries based on the preliminary evidence. In an embodiment, this next hop prediction module can be applied as many as seven times to update the evidence chains, each time improving the FEVEROUS score.

On the final evidence chains, the label ("supports", "refutes", or "not enough information") is predicted by a module trained on extracted evidence chains. Because "not enough information" (NEI) labels are scarce, the present invention alternatively can decide whether to give an NEI label based on whether the next hop predictor is still seeking more evidence for the claim. For all elements, inputs are carefully represented to facilitate numerical comparisons and the use of other contextual information.

In an embodiment, the described system attains a FEVEROUS score of 0.281 on the development set with label accuracy of 0.658.

Context and Structured Information

Downstream classifiers usually classify page elements in isolation, but the meaning of these elements sometimes is not clear without contextual information. In the FEVER task, attaching a prefix to each sentence including the page title in brackets improved performance, for example by providing hints about what pronouns might refer to. This practice is continued for FEVEROUS.

For list elements, the page element immediately preceding the list is taken as context. This often is a sentence indicating what is in the list. Then the list element is represented by "[title] CONTEXT context VALUE list item", so that the list element and what the list is about may be seen simultaneously.

For table cells, the entire row is represented including the cell. If a cell in a row above has an is_header attribute, the cells are prefixed with "KEY header". This is followed by the actual value from the current row, in the form "VALUE header". Thus each cell in a row looks like a combination of key/value pairs (or simply values if there is no header). All the cells in a row would look alike if we simply followed this procedure, so the present invention distinguishes the key/value pair corresponding to the current cell by enclosing it in double braces. Finally, the title is prepended, and if there is a caption, it is prepended as "CAPTION caption". Examples of the table cell, list element, and sentence formats are shown in Table 1 of FIG. 2. That is, FIG. 2 is a diagram showing TABLE 1 of example representations of various page elements, in accordance with an embodiment of the present invention.

Preliminary Evidence Retrieval

A baseline system is followed to select an initial set of documents for downstream analysis. This module retrieves documents whose titles match named entities that appear in the claim, plus documents with a high TF-IDF score against the claim, up to five total documents in an embodiment. Other numbers of documents can also be retrieved depending upon the implementation.

The present invention also considers the use of GENRE to identify more Wikipedia page titles from entities that were not quite exact matches. An exact match is preferred if present. The use of these entities actually drove the FEVEROUS score down, perhaps by crowding out the TF-IDF documents, so a reversion was made to the baseline approach.

Given a set of documents, the present invention ranks page elements using models trained to predict the set of evidence elements. One model is trained on sentences, list elements, and table captions, and the other model is trained on table cells. The present invention uses a RoBERTa base model and follows a training approach similar to the Dense Passage Retriever. Given a positive training pair consisting of a claim c and a piece of evidence e, we collect six negative pairs (c; $x_i$) in an embodiment (of course other numbers of negative pairs can be collected). For four (or some percentage or amount) of the negatives, the present invention takes $x_i$ to be the highest TF-IDF matches returned by the baseline system that are not part of the gold evidence. For the other two negatives (or some other percentage or amount), the present invention takes $x_i$ to be part of the gold evidence for a different claim, randomly chosen. The multiple choice classification head of RoBERTa outputs a scalar f(c; x) for each pair, and the batch of seven pairs is trained as one example with the cross-entropy loss $$-\log \frac{e^{f(c,e)}}{e^{f(c,e)} + \sum_{i=1}^{6} e^{f(c,x_i)}} \quad (1)$$

just as in the Dense Passage Retriever. At test time, the present invention runs the model on examples of a single claim/evidence pair and collects the scalar f(c; x). These outputs are ranked across all potential evidence to collect five sentences and 25 table cells in one illustrative embodiment. In other embodiments, other numbers of sentences and table cells can be collected. Every sentence in the retrieved documents is ranked, but only the top three tables (or some other number) retrieved by the baseline TF-IDF ranker are considered for extracting table cells.

The baseline system extracts sentences and other non-cell elements by TF-IDF similarity to the claim, and table cells with a RoBERTa base sized model that performs sequence tagging on linearized tables. TABLE 2 of FIG. 3 compares the recall of our system (top 25 cells and five non-cell page elements) to these modules. That is, FIG. 3 shows a TABLE 2 indicating page element recall, in accordance with an embodiment of the present invention. This is computed by taking the union of all page elements (cells or non-cells) in all evidence chains in all claims, and considering the fraction that belong to one of our predicted evidence sets for the corresponding claims. We recall more relevant table cells, but surprisingly, fewer relevant sentences. An embodiment may use either the table cell ranking model or the TF-IDF method, and either the sentence ranking model or the TF-IDF method, as deemed appropriate. In the subsequent discussion, an embodiment using both the table cell ranking model and the sentence ranking model is considered.

Next Hop Prediction

The use of the evidence ranking model is not sufficient to solve problems that require true multi-hop reasoning. Though evidence chains are typically rooted in entities and concepts that appear in the claim, as one progresses down the chain it may be necessary to retrieve information about an entity mentioned in a previous piece of evidence. Such information would be difficult to query based on the claim alone.

Figure 4:
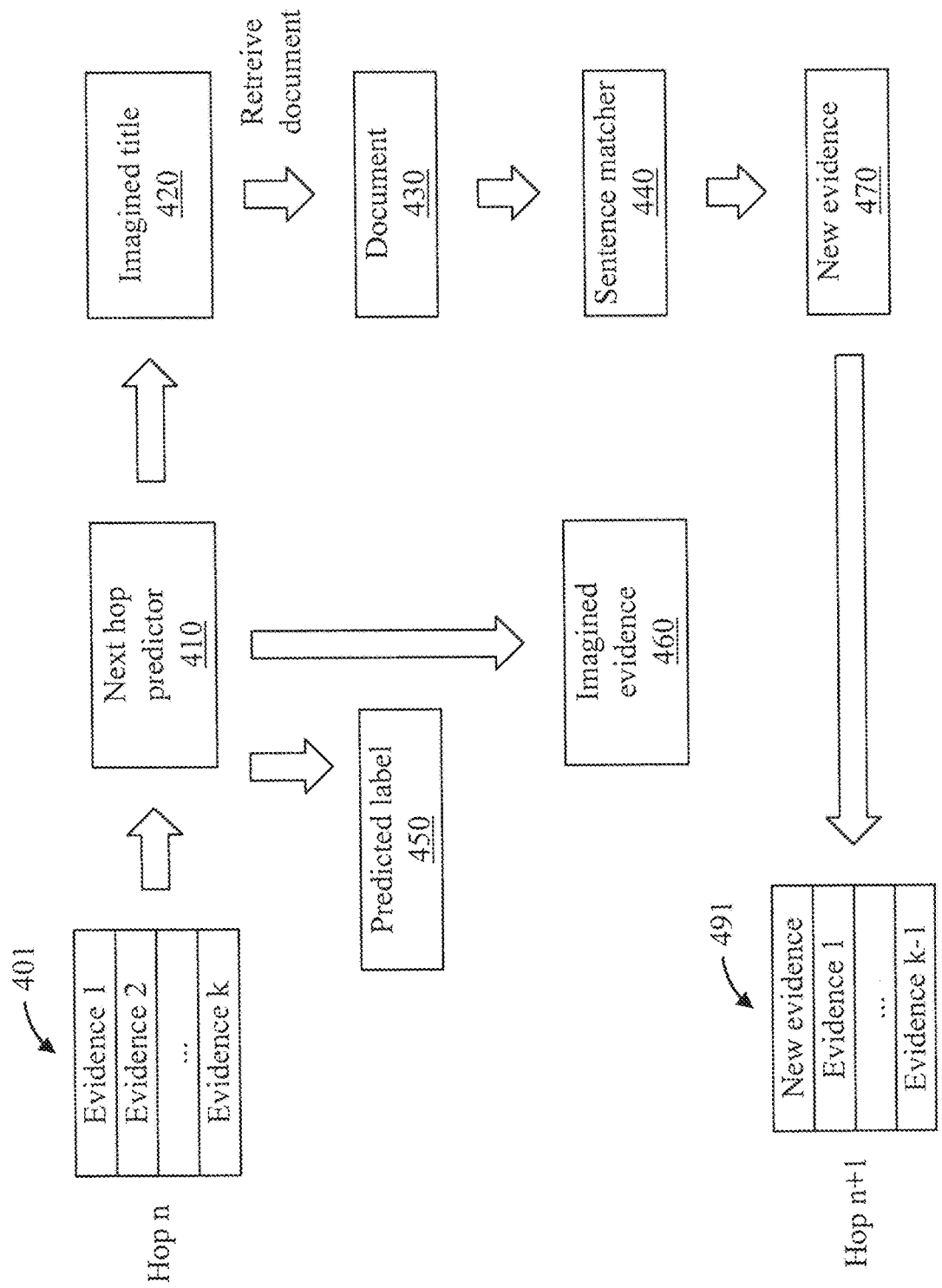
FIG. 4 is a block diagram showing a next hop prediction system, in accordance with an embodiment of the present invention.

To support this scenario, the present invention introduces a next hop prediction system 400, as shown in FIG. 4, in accordance with an embodiment of the present invention. Hop 1 includes the evidence 401 retrieved by the evidence ranking module. Given an evidence set 401 produced in hop n, the next hop predictor 410 attempts to imagine information that is still needed but not retrieved yet. The next hop predictor 410 generates a string consisting of the predicted label 450, the title of the needed article 420 and the sentence or table cell 460 (in the same format as before) that it wants to retrieve from that article. If available, the article with that title 430 is retrieved; otherwise, sentences from previously retrieved articles will be searched. Then, a sentence matcher 440 chooses one sentence and two table cells 470 with the best word overlap against the imagined evidence. The bottom ranked elements of the evidence set for hop n are pushed out, and these chosen elements are pushed to the top of the evidence set 491 for hop n+1. The relevance module was found not to be helpful in ranking newly retrieved evidence, often because it strayed too far from the original claim.

The next hop predictor 410 is implemented by a T5 base sized model. T5 includes a text-to-text encoder-decoder transformer architecture, and its pre-training mixes multiple unsupervised objectives on the Colossal Clean Crawled Corpus with supervised NLU tasks including abstractive summarization, question answering, GLUE text classification, and translation, cast into a text to text format. In our task, each input begins with the task identifier "missing:" and a list of the pages retrieved already, followed by the string [HYP] and then the claim being classified. Then the elements of the current evidence set (each beginning with a page title in brackets) are concatenated.

Training is based on the gold evidence chains in the training set, and the set of documents retrieved by the baseline model. Every example with evidence from a missing document is used as an example, with the current evidence set 401 being the gold evidence in the retrieved documents and the target evidence (to be predicted by 460) being the first piece of evidence from a missing document. For half of the remaining examples (those with no missing documents) including all NEI examples with multiple pieces of evidence, a piece of evidence is randomly left out from the current evidence set, and that evidence is to be predicted as the target. In the other examples, the word "none" is to be predicted, indicating that the evidence chain is complete.

The target output strings are the word "supports" or "refutes," followed by the target evidence in the usual format or "none." For NEI examples, "supports" is to be predicted, indicating a partial evidence chain with no contradictions yet. Thus the log likelihood objective on the target output string amounts to a multi-task objective, combining a prediction of missing evidence with a prediction of the label based on partial information.

The existence of distracting evidence distinguishes the training setting from the testing setting. At test time, the module is always queried with a full set of five sentences and 25 cells, some of which may be irrelevant. For comparison, the present invention trained a model with extracted evidence instead of gold evidence, but the model trained on gold chains achieved more complete chains in fewer hops.

Table 3 in FIG. 5 describes the performance of the next hop predictor on the development set. That is, FIG. 3 shows a TABLE 3 indicating the performance of the next hop prediction module 410 of FIG. 4, in accordance with an embodiment of the present invention. "Improved," "Same," and "Worse" compare the number of pieces of gold evidence successfully predicted to the number predicted in the previous hop. "Complete" indicates the number of examples for which a complete evidence set is predicted. "FEVEROUS score" is the result based on the labels output by the next hop predictor (without subsequent modules) and the evidence predicted. Each subsequent hop (up to five) improves the fraction of evidence retrieved, and the FEVEROUS score is monotonically improving up to at least seven hops. This implies that the module knows when to stop and output "none," or else its predictions would eventually overwrite needed evidence from the initial retrieval.

Label Classification

After the next hop predictor has been run for seven hops, the system of the present invention uses a label classification module to predict the final label. Another T5 base model is used for this problem, but here the present invention trains on the extracted evidence sets (including irrelevant evidence, and missing some gold evidence) that are collected for the training set. We take evidence sets after one hop. Input strings are the same as for the next hop predictor module. The target strings are just "supports," "refutes," or "neutral." As NEI instances only make up 3% of the training set in FEVEROUS, this label is never learned and the outputs are either "supports" or "refutes."

In Table 4 of FIG. 6, which shows label classification models in accordance with the present invention, it can be seen that a RoBERTa model has trouble learning in the presence of irrelevant evidence, but is confused by the distractions if only trained on gold evidence chains. In contrast, a T5 model can train and perform successfully on real extracted evidence chains.

Math hints. This basic model can be made even more effective by providing some mathematical hints. As numbers are represented as (possibly several) strings of digits, each with its own pre-trained embedding, it is difficult for the model to answer numerical comparison questions. Also, the model may not precisely know the relationship between a number as a word ("fourteen") and its numerical form ("14").

We attach hints to the beginning of each premise (list of concatenated evidence) as follows. Numbers in the claim or premise appearing in word form (up to twenty, and multiples of ten, one hundred, and one thousand) are converted to their numerical form, and we attach strings such as "four equals 4" for each conversion. Then we collect all numbers (including decimals and integers with commas) with a regular expression, and sort them (along with the number words) from least to greatest, forming a string such as "LEAST 0 less than 1 less than 30 less than 2017 GREATEST". After these prefixes the original premise begins. It can be clearly recognized because it begins with a title inside brackets.

The NEI class. The NEI class did not have enough examples to be learned reliably in the standard training procedure, but represents 19% of examples in the final test set in FEVEROUS. To address this, the baseline system up samples the NEI class by leaving out sentences or entire tables from gold evidence chains to create more NEI examples. For our system, our training data consists of extracted evidence chains rather than gold evidence chains. In addition to the natural NEI examples, we labeled any extracted chain that was still missing information as NEI, gave other extracted chains (including irrelevant evidence) that were complete their original "supports" or "refutes" label, and trained a T5 base model with the resulting labels. In the resulting training set, 58% of examples were NEI, 20% were refutes, and 23% were supports.

As seen in the confusion matrix of Table 5 in FIG. 7 in accordance with an embodiment of the present invention, the T5 model could not learn the NEI class well and was biased towards NEI even on supporting or refuting examples. Even if 19% of true labels were NEI, as in the test set, the decrease in accuracy on supporting and refuting classes is too great to justify trying to predict this label. Therefore, one embodiment of the present invention is trained to predict only "supports" or "refutes" and never NEI. Other embodiments may predict all three labels.

An interesting alternative would be to use the existence of an evidence prediction from the next hop predictor after the final hop to indicate whether an example should be NEI. Following this approach, only 4.4% of NEI examples would be predicted as NEI, compared to 2.8% of supporting and 2.9% or refuting examples, so again including the NEI predictions would yield a net loss.

Figure 8:
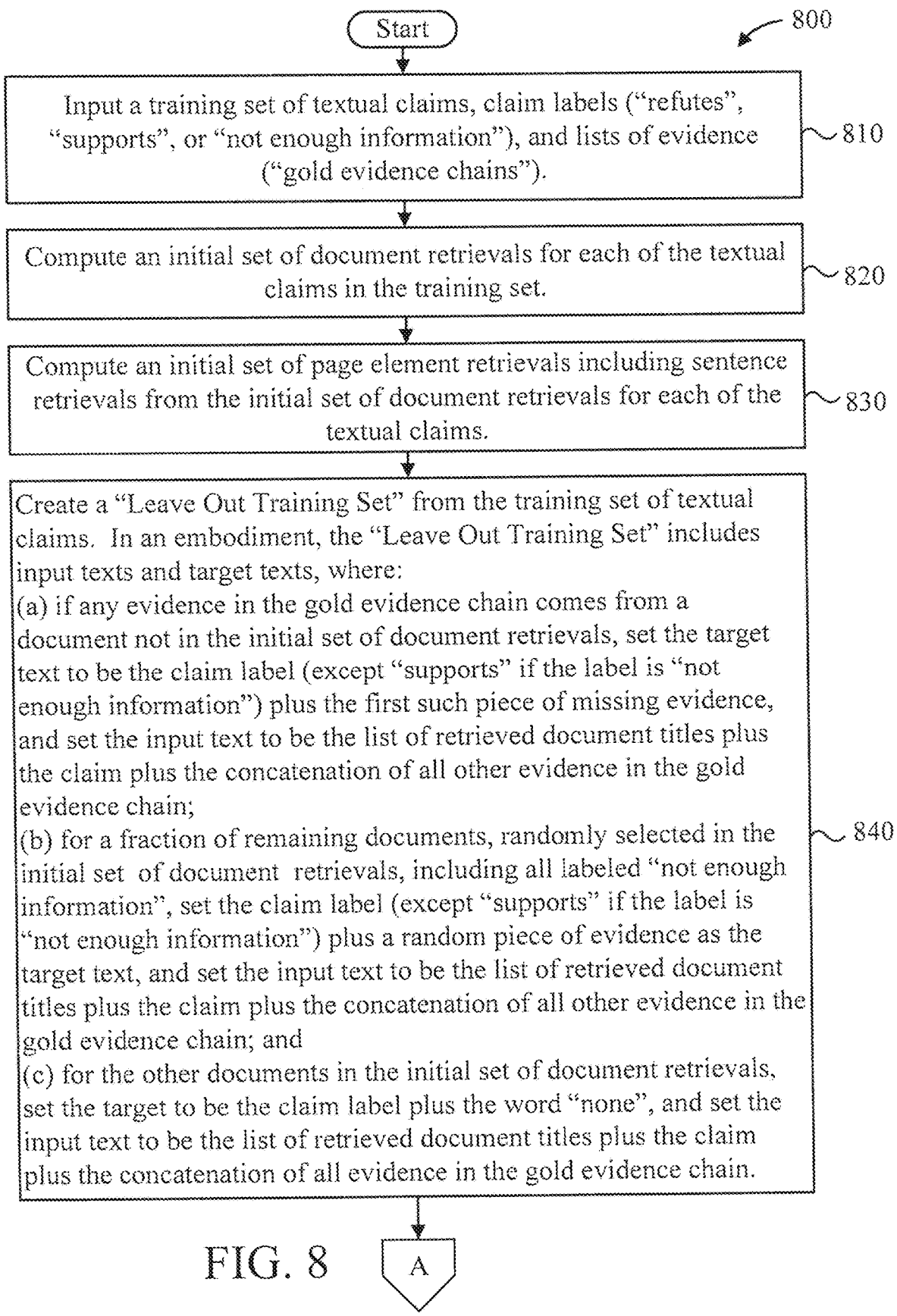
FIGS. 8-9 show an exemplary training method for multi-hop evidence pursuit, in accordance with an embodiment of the present invention.
Figure 9:
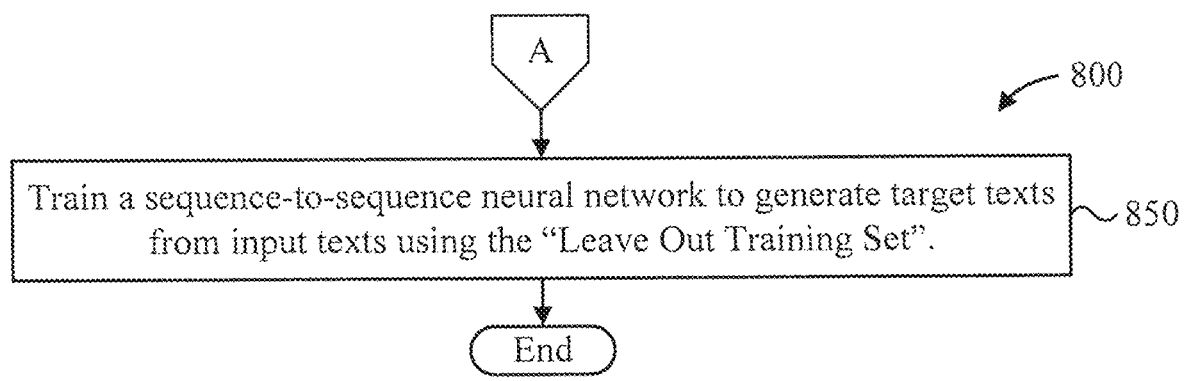

FIGS. 8-9 show an exemplary training method 800 for multi-hop evidence pursuit, in accordance with an embodiment of the present invention.

At block 810, input a training set of textual claims, claim labels ("refutes", "supports", or "not enough information"), and lists of evidence ("gold evidence chains").

At block 820, compute an initial set of document retrievals for each of the textual claims in the training set. In an embodiment, block 820 is performed, for example, using a Term Frequency—Inverse Document Frequency (TFIDF) document retriever queried by the claims.

At block 830, compute an initial set of page element retrievals including sentence retrievals from the initial set of document retrievals for each of the textual claims;

At block 840, create a "Leave Out Training Set" from the training set of textual claims. In an embodiment, the "Leave Out Training Set" includes input texts and target texts, where:
 (a) if any evidence in the gold evidence chain comes from a document not in the initial set of document retrievals, set the target text to be the claim label (except "supports" if the label is "not enough information") plus the first such piece of missing evidence, and set the input text to be the list of retrieved document titles plus the claim plus the concatenation of all other evidence in the gold evidence chain;

(b) for a fraction of remaining documents, randomly selected in the initial set of document retrievals, including all labeled "not enough information", set the claim label (except "supports" if the label is "not enough information") plus a random piece of evidence as the target text, and set the input text to be the list of retrieved document titles plus the claim plus the concatenation of all other evidence in the gold evidence chain; and (c) for the other documents in the initial set of document retrievals, set the target to be the claim label plus the word "none", and set the input text to be the list of retrieved document titles plus the claim plus the concatenation of all evidence in the gold evidence chain.

At block 850, train a sequence-to-sequence neural network to generate target texts from input texts using the "Leave Out Training Set". In an embodiment, the sequence-to-sequence neural network is T5 (the Unified Text to Text Transformer).

Figure 10:
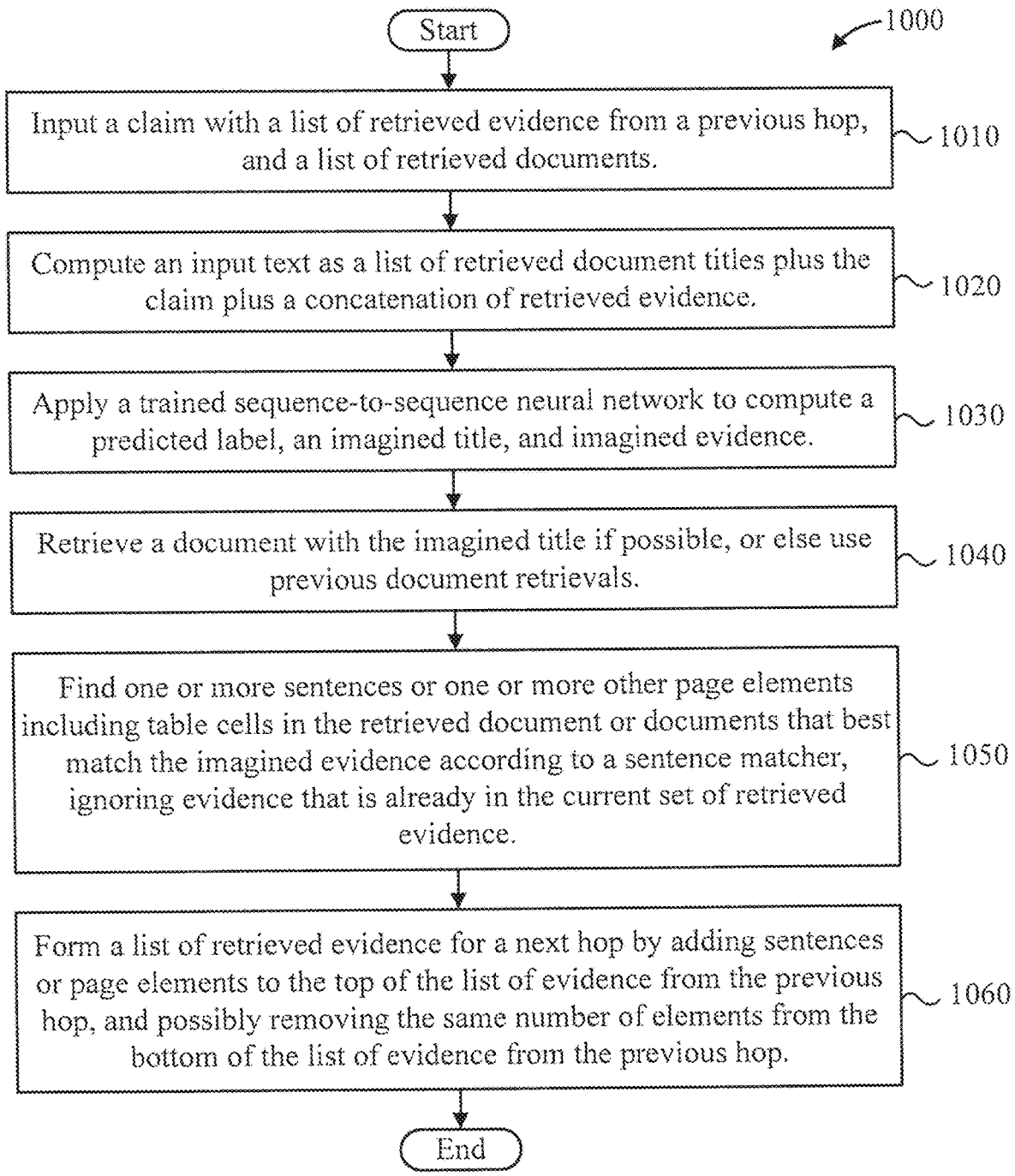
FIG. 10 shows an exemplary inference method for multi-hop evidence pursuit, in accordance with an embodiment of the present invention.

FIG. 10 shows an exemplary inference method 1000 for multi-hop evidence pursuit, in accordance with an embodiment of the present invention.

At block 1010, input a claim with a list of retrieved evidence from a previous hop, and a list of retrieved documents.

At block 1020, compute an input text as a list of retrieved document titles plus the claim plus a concatenation of retrieved evidence.

At block 1030, apply a trained sequence-to-sequence neural network to compute a predicted label, an imagined title, and imagined evidence.

At block 1040, retrieve a document with the imagined title if possible, or else use previous document retrievals. In one embodiment, the imagined title is required to exactly match the title of a document in the corpus. In other embodiments, less strict matches may be used to find a document with a title close to the imagined title, such as by TF-IDF score of character n-grams of the title.

At block 1050, find one or more sentences or one or more other page elements including table cells in the retrieved document or documents that best match the imagined evidence according to sentence matcher 300, ignoring evidence that is already in the current set of retrieved evidence. In one embodiment, the sentence matcher counts word and entity matches between the imagined and actual sentences. In another embodiment, a natural language inference model may be used to compare the meaning of the two sentences by using a neural network.

At block 1060, form a list of retrieved evidence for a next hop by adding sentences or page elements to the top of the list of evidence from the previous hop, and possibly removing the same number of elements from the bottom of the list of evidence from the previous hop.

Figure 11:
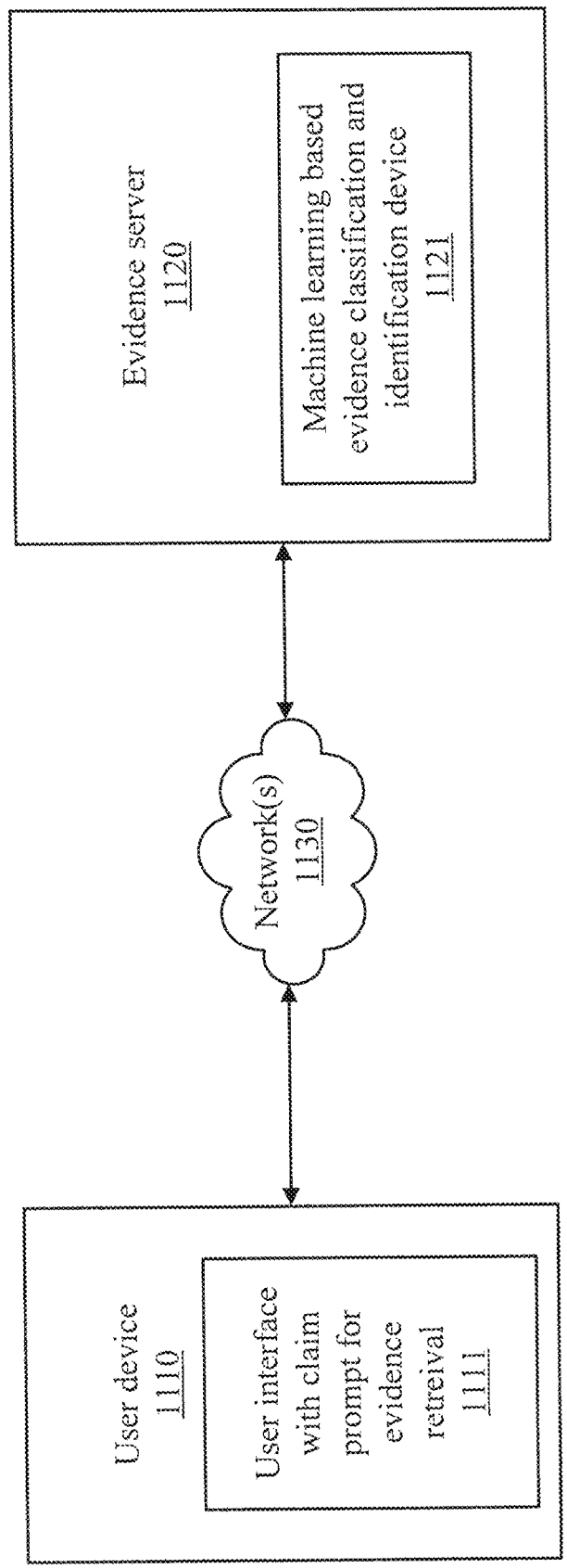
FIG. 11 is a document retrieval system, in accordance with an embodiment of the present invention.

FIG. 11 is a evidence retrieval system 1100, in accordance with an embodiment of the present invention.

The document evidence system 1100 includes an evidence server 1120 and a user device 1110 that communicate with each other over one or more networks 1130. The user device 1110 can be a computing device including a desktop, a laptop, a tablet, a smartphone, and so forth. The evidence server 1120 is configured to perform at least portions of methods 800 (for training) and 1000 (for inference). The evidence server 1120 includes a machine learning based evidence classification and identification device 1121.

A user of the user device 1110 is prompted on a user interface 1111 (with claim prompt for evidence retrieval) of the user device 1110 to submit a claim with a list of retrieved evidence from a previous hop and a list of retrieved documents. Natural Language Processing (NLP) may be used to segment/parse the inputs into its constituent parts (claim, retrieved evidence, list of retrieved documents). That is, method 1000 is performed in order to output, based on the preceding input, a predicted label, an imagined title, and imagined evidence. Then, one of more sentences or one or more page elements are found in retrieved documents with the imagined title or previous document retrievals that best match the imagined evidence. A list of evidence is formed for the next hop by adding the one or more sentences or one or more page elements to the top of the list of evidence from the previous hop, possibly removing the same number of elements from the bottom of the list to maintain list size (not exceed a threshold list size).

Figure 12:
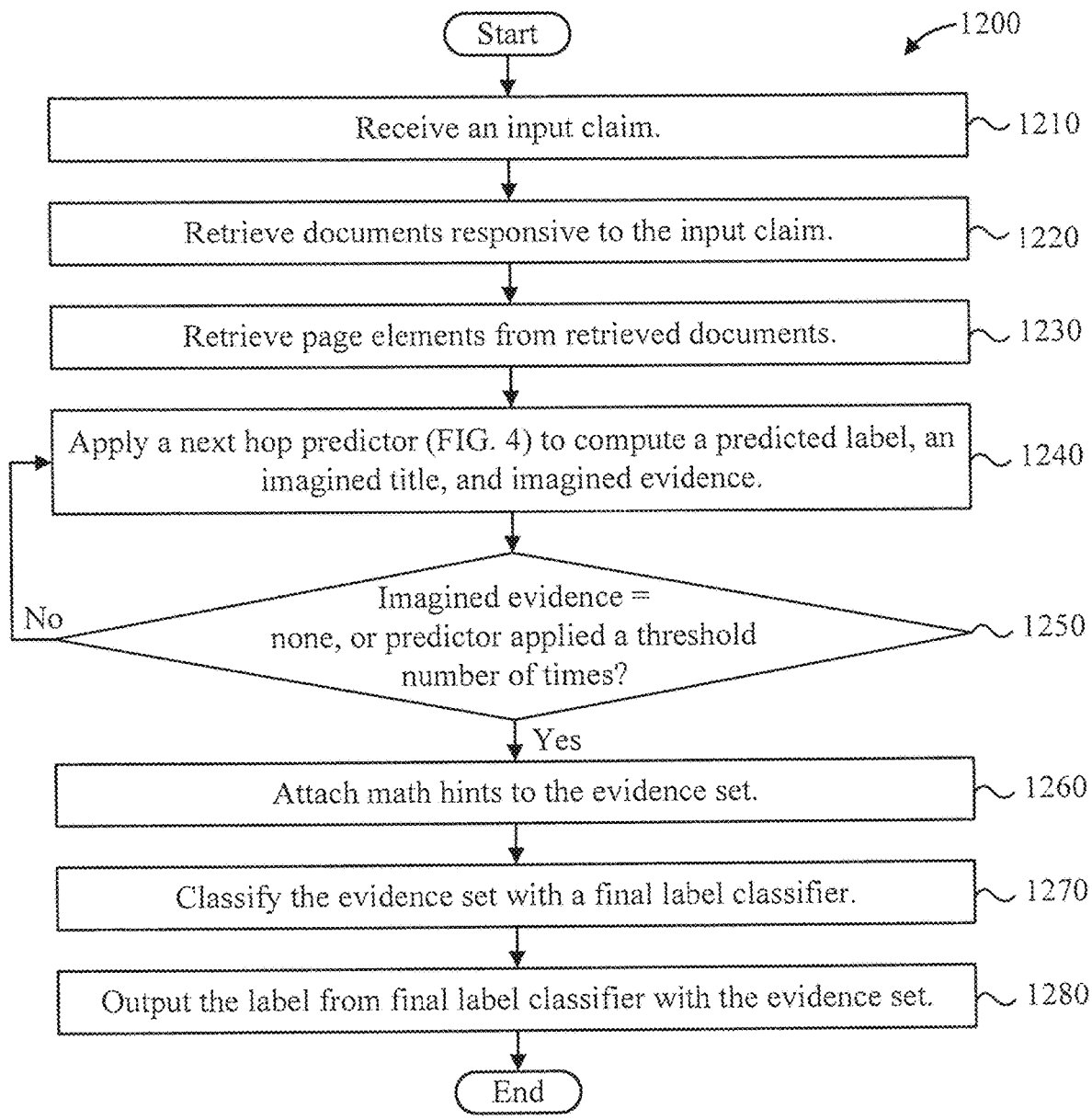
FIG. 12 shows another exemplary inference method for multi-hop evidence pursuit, in accordance with an embodiment of the present invention.

FIG. 12 shows an exemplary inference method 1200 for multi-hop evidence pursuit, in accordance with an embodiment of the present invention, illustrating how the invention can be applied to solve a claim verification task, by applying FIG. 4 multiple times.

At block 1210, receive an input claim.

At block 1220, retrieve documents responsive to the input claim.

At block 1230, retrieve page elements from retrieved documents.

At block 1240, apply a next hop predictor (FIG. 4) to compute a predicted label, an imagined title, and imagined evidence.

At block 1250, if the imagined evidence 460 is "none" or the next hop predictor has been applied seven (or some number) of times, proceed to block 1260. Otherwise, return to block 1240.

At block 1260, attach math hints to the evidence set.

At block 1270, classify the evidence set with a final label classifier.

At block 1280, output the label from final label classifier with the evidence set.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for neural network training, comprising:
   inputting a training set of textual claims, lists of evidence including gold evidence chains, and claim labels labelling the evidence with respect to the textual claims, the claim labels including refutes, supports, and not enough information (NEI);
   computing an initial set of document retrievals for each of the textual claims;
   computing an initial set of page element retrievals including sentence retrievals from the initial set of document retrievals for each of the textual claims;
   creating, from the training set of textual claims, a Leave Out Training Set which includes input texts and target texts, where
   (a) if any evidence in a gold evidence chain comes from a document not in the initial set, setting a target text to be the claim label plus a first piece of missing evidence, and setting the input text to be a list of retrieved document titles from the initial set plus a corresponding textual claim plus a concatenation of all other evidence in the gold evidence chain; and
   (b) for a fraction of remaining documents, randomly selected in the initial set, including all labeled NEI, setting the claim label plus a random piece of evidence as the target text, and setting the input text to be the list of retrieved document titles plus the corresponding textual claim plus a concatenation of all other evidence in a corresponding gold evidence chain; and
   training, by a processor device, a sequence-to-sequence neural network to generate new target texts from new input texts using the Leave Out Training Set.

2. The computer-implemented method of claim 1, wherein said creating step further comprises: (c) for other documents in the initial set, setting the target to be the claim label plus the word none, and setting the input text to be the list of retrieved document titles plus the corresponding textual claim plus the concatenation of all evidence in the non-corresponding gold evidence chain.

3. The computer-implemented method of claim 1, wherein computing an initial set of document retrievals for each of the textual claims in the training set comprises using a Term Frequency-Inverse Document Frequency (TFIDF) document retriever queried by the claims.

4. The computer-implemented method of claim 1, further comprising performance an inference method subsequent to the training method, the inference method comprising:
   inputting a claim with a list of retrieved evidence from a previous hop, and a list of retrieved documents;
   computing an input text as a list of retrieved document titles plus the claim plus a concatenation of retrieved evidence; and
   applying a trained sequence-to-sequence neural network to compute a predicted label, an imagined title, and imagined evidence.

5. The computer-implemented method of claim 4, wherein said inference method further comprises:
   retrieving a document with the imagined title if possible, or else use previous document retrievals;
   finding one or more sentences or one or more other page elements including table cells in the retrieved document or document retrievals that best match the imagined evidence according to a counting-based or machine-learning based sentence matcher, ignoring existing evidence that is already in the current set of retrieved evidence; and
   forming a list of retrieved evidence for a next hop by adding sentences or page elements to a top of the list of retrieved evidence from the previous hop.

6. The computer-implemented method of claim 5, wherein said forming step further comprising removing a same number of elements from the bottom of the list of retrieved evidence from the previous hop.

7. The computer-implemented method of claim 5, further comprising:
   classifying the retrieved evidence in the list with a final label classification; and
   displaying on a display device the final label classification with the retrieved evidence in the list.

8. The computer-implemented method of claim 1, wherein the sequence-to-sequence neural network is a Unified Text to Text Transformer.

9. The computer-implemented method of claim 1, wherein (a) if any evidence in a gold evidence chain comes from the document not in the initial set, setting the target text to be the label, except supports if the label is NEI, plus the first piece of missing evidence.

10. The computer-implemented method of claim 1, wherein (b) for the random half of remaining documents in the initial set, including all labeled NEI, setting the label, except supports if the label is NEI, plus the random piece of evidence as the target text.

11. The computer-implemented method of claim 1, wherein computing an initial set of page element retrievals for each of the textual claims in the training set corpus comprises using a Term Frequency-Inverse Document Frequency retriever queried by the claims.

12. The computer-implemented method of claim 1, wherein computing an initial set of page element retrievals for each of the textual claims in the training set corpus comprises using a neural network based ranking module queried by the claims.

13. A computer program product for neural network training, the computer program product comprising a non-transitory computer readable storage medium having program instructions embodied therewith, the program instructions executable by a computer to cause the computer to perform a method comprising:
   inputting, by a user interface of the computer, a training set of textual claims, lists of evidence including gold evidence chains, and claim labels labelling the evidence with respect to the textual claims, the claim labels including refutes, supports, and not enough information (NEI);
   computing, by a processor device of the computer, an initial set of document retrievals for each of the textual claims;
   computing, by the processor device, an initial set of page element retrievals including sentence retrievals from the initial set of document retrievals for each of the textual claims;

creating, by the processor device from the training set of textual claims, a Leave Out Training Set which includes input texts and target texts, where (a) if any evidence in a gold evidence chain comes from a document not in the initial set, setting a target text to be the claim label plus a first piece of missing evidence, and setting the input text to be a list of retrieved document titles from the initial set plus a corresponding textual claim plus a concatenation of all other evidence in the gold evidence chain; and (b) for a fraction of remaining documents, randomly selected in the initial set, including all labeled NEI, setting the claim label plus a random piece of evidence as the target text, and setting the input text to be the list of retrieved document titles plus the corresponding textual claim plus a concatenation of all other evidence in a corresponding gold evidence chain; and training, by the processor device, a sequence-to-sequence neural network to generate new target texts from new input texts using the Leave Out Training Set.

14. The computer program product of claim 13, wherein said creating step further comprises: (c) for other documents in the initial set, setting the target to be the claim label plus the word none, and setting the input text to be the list of retrieved document titles plus the corresponding textual claim plus the concatenation of all evidence in the corresponding gold evidence chain.

15. The computer program product of claim 13, wherein computing an initial set of document retrievals for each of the textual claims in the training set comprises using a Term Frequency-Inverse Document Frequency (TFIDF) document retriever queried by the claims.

16. The computer program product of claim 13, further comprising performance an inference method subsequent to the training method, the inference method comprising:

inputting a claim with a list of retrieved evidence from a previous hop, and a list of retrieved documents;

computing an input text as a list of retrieved document titles plus the claim plus a concatenation of retrieved evidence; and applying a trained sequence-to-sequence neural network to compute a predicted label, an imagined title, and imagined evidence.

17. The computer program product of claim 16, wherein said inference method further comprises:

retrieving a document with the imagined title if possible, or else use previous document retrievals;

finding one or more sentences or one or more other page elements including table cells in the retrieved document or document retrievals that best match the imagined evidence according to a counting based or machine-learning based sentence matcher, ignoring existing evidence that is already in the current set of retrieved evidence; and forming a list of retrieved evidence for a next hop by adding sentences or page elements to a top of the list of retrieved evidence from the previous hop.

18. The computer program product of claim 17, wherein said forming step further comprising removing a same number of elements from the bottom of the list of retrieved evidence from the previous hop.

19. A computer processing system for neural network training, comprising:

a memory device for storing program code;

a processor device operatively coupled to the memory device for running the program code to:

input a training set of textual claims, lists of evidence including gold evidence chains, and claim labels labelling the evidence with respect to the textual claims, the claim labels including refutes, supports, and not enough information (NEI);

compute an initial set of document retrievals for each of the textual claims;

compute an initial set of page element retrievals including sentence retrievals from the initial set of document retrievals for each of the textual claims;

create, from the training set of textual claims, a Leave Out Training Set which includes input texts and target texts, where (a) if any evidence in a gold evidence chain comes from a document not in the initial set, set a target text to be the claim label plus a first piece of missing evidence, and set the input text to be a list of retrieved document titles from the initial set plus a corresponding textual claim plus a concatenation of all other evidence in the gold evidence chain; and (b) for a fraction of remaining documents, randomly selected in the initial set, including all labeled NEI, set the claim label plus a random piece of evidence as the target text, and set the input text to be the list of retrieved document titles plus the corresponding textual claim plus a concatenation of all other evidence in a corresponding gold evidence chain; and train a sequence-to-sequence neural network to generate new target texts from new input texts using the Leave Out Training Set.

20. The computer processing system of claim 19, wherein said processor device further runs the program code such that creating the Leave Out Training Set further comprises: (c) for other documents in the initial set, setting the target to be the claim label plus the word none, and setting the input text to be the list of retrieved document titles plus the corresponding textual claim plus the concatenation of all evidence in the corresponding gold evidence chain.

* * * * *